United States Patent [19]
Plomondon et al.

[11] Patent Number: 5,729,599
[45] Date of Patent: Mar. 17, 1998

[54] METHOD AND SYSTEM OF FORWARDING CALLS IN A REMOTE ACCESS CALL FORWARDING SERVICE OF A TELEPHONE SYSTEM

[75] Inventors: Karen L. Plomondon, Lafayette, Colo.; Lotus Anne Mardick, Scottsdale, Ariz.; Joshua D. Staller, Littleton, Colo.

[73] Assignee: U S West, Inc., Englewood, Colo.

[21] Appl. No.: 664,207

[22] Filed: Jun. 11, 1996

[51] Int. Cl.⁶ .............................. H04M 3/42; H04M 3/00; H04M 1/66; H04M 7/00
[52] U.S. Cl. .................... 379/211; 379/188; 379/189; 379/196; 379/197; 379/219; 379/230
[58] Field of Search .............................. 379/188, 189, 379/196, 197, 201, 207, 210, 211, 212, 219, 220, 229, 230

[56] References Cited

U.S. PATENT DOCUMENTS

| | | | |
|---|---|---|---|
| 5,022,067 | 6/1991 | Hughes | 379/95 |
| 5,347,574 | 9/1994 | Morganstein | 379/210 |
| 5,365,580 | 11/1994 | Morisaki | 379/189 |
| 5,408,528 | 4/1995 | Carlson et al. | 379/211 |
| 5,430,791 | 7/1995 | Feit et al. | 379/67 |
| 5,432,845 | 7/1995 | Burd et al. | 379/210 |
| 5,572,579 | 11/1996 | Orriss et al. | 379/211 X |
| 5,592,541 | 1/1997 | Fleischer, III et al. | 379/211 |
| 5,615,253 | 3/1997 | Kocan et al. | 379/211 X |

*Primary Examiner*—Harry S. Hong
*Attorney, Agent, or Firm*—Brooks & Kushman

[57] ABSTRACT

A remote access call forwarding method and system adapted for an Advanced Intelligent Network to forward a call incoming to a subscriber's telephone number in response to a routing destination number if the routing destination number does not correspond to a blocked destination identifier retrieved from a database. Further, a search to a subscriber profile unique to each subscriber is provided, the subscriber profile containing valid routing destination numbers previously validated to which the calls incoming to the subscriber have previously been forwarded. Thus, calls are forwarded in response to the routing destination number when the routing destination number matches a valid destination number found in the subscriber profile.

24 Claims, 2 Drawing Sheets

METHOD AND SYSTEM OF FORWARDING CALLS IN A REMOTE ACCESS CALL FORWARDING SERVICE OF A TELEPHONE SYSTEM

TECHNICAL FIELD

This application relates to a method and system of forwarding communication calls in a remote access call forwarding service of a telephone system.

BACKGROUND ART

Call forwarding is one of several calling features presently available to telephone subscribers. Call forwarding allows a telephone subscriber to forward calls incoming to his or her telephone number to another telephone number. Call forwarding services may typically be activated or deactivated only from a subscriber's telephone. In operation, the subscriber enters a service code followed by a destination telephone number to which incoming calls are to be forwarded.

A variation of call forwarding is remote access call forwarding. Like standard call forwarding, remote access call forwarding allows a subscriber to forward calls incoming to his or her telephone number to another telephone number. In contrast to standard call forwarding, however, this service may be accessed "remotely", i.e. it may be accessed from network locations other than the subscriber's telephone.

Specifically, remote access forwarding can take place from any telephone capable of serving as a source of Dual Tone Multifrequency (DTMF) signals, or with a device capable of producing DTMF signals. Unfortunately, there exist known types of fraudulent activity associated with remote access call forwarding services perpetrated by persons other than the subscriber.

As those skilled in the art will recognize, call forwarding services have problems associated with misuse or fraud. Remote access call forwarding services are generally even more vulnerable to fraudulent misuse and deceptive practices by third parties because of the ability to manipulate such services from outside of the subscriber's home or office. Even if the subscriber is given a security code or personal identification number (PIN) in order to gain admission to the service, it may be possible to circumvent such codes through deceit or by trial and error.

Additionally, the call forwarding subscriber is billed for all toll charges incurred by the call routing in response to remote access call forwarding. Therefore, a third-party who obtains access to a subscriber's call forwarding service is able to make calls—long-distance or otherwise—so that these calls are billed directly to the subscriber without the subscriber's knowledge or assent.

To gain access to the subscriber's remote access call forwarding service, typically a third-party must enter the subscriber's telephone number and security code. If the third-party successfully gains access, she is provided with options to change the subscriber's security code, service status and forwarding destination. The third-party is then able to forward the subscriber's calls to a destination telephone number or numbers of his or her potentially limitless choice without ever stepping foot in the subscriber's home. Henceforth, by dialing the subscriber's number, the third-party's call is rerouted to the specified routing destination, and the unscrupulous third-party may talk for hours at the expense of the subscriber. This process may be repeated countless times.

Coin and coinless public & pay telephones are the destination of a majority of fraudulent collect calls because remote access call forwarding allows a user to disguise the class of service of the originating station, the subscriber station, or the destination as seen by the operator.

It is understood by those skilled in the art that the aforementioned potential abuses of the remote access call forwarding service are, of course, limited only by the imagination of the third-party offender. Whether for pleasure or profit, this actor desires to forward communication calls incoming to a subscriber's telephone number to another location, such as a pay telephone, public telephone or other class of phone. As a result, the misuse issues inherent in the prior art remote access call forwarding services have resulted in increased costs which, in turn, have caused phone companies and consumers alike to demand feasible alternatives.

One such alternative presently utilized is to incorporate fraud prevention features into the network so that a user is not permitted to remotely forward calls incoming to predetermined groups of numbers. For example, those numbers having certain NPA's such as 900 or 800 and numbers having certain NXX's such as 976 or 960 may be blocked. Further, NPA-NXX-XXXX's and XXX-XXXX's (such as NPA-555-1212) and numbers having prefixes such as 0+ and 00+ are capable of being blocked. Therefore, as currently exists, a subscriber may be able to block forwarding to such telephone number prefix-groups such as 800, 900 or 976 telephone numbers. However, there is no way to detect and prohibit a subscriber's calls from being forwarded to a pay telephone or public telephone because such numbers do not have distinct numbering plans or prefix designations.

Conventional switch-based telephone systems similarly lack the capability to store valid routing destination numbers which are unique to the subscriber. Such a feature is attractive because to otherwise initiate a query to a network-wide database in order to search for blocked destination identifiers or numbers may consume processing time and memory. Such internal forwarding protection and screening is costly in the form of increased processing time and dedicated memory. Further, conventional switch-based telephone systems do not provide user friendly voice prompts to assist the caller in accessing and using the system.

Consequently, a need has developed for an improved remote access call forwarding method and system adapted for use in an Advanced Intelligent Network (AIN). Such method and system prohibits a user from forwarding a subscriber's calls to a routing destination number that is classified as blocked, such as a coin or coinless public/pay telephone. The method and system forwards only those telephone calls incoming to the subscriber's telephone number to routing destination numbers which are identified as unblocked destinations. The blocked destination determination is a result of a query generated to a Line information Database of the AIN network, or to an external network-wide database.

Such a method and system should further incorporate a subscriber profile or database having valid routing destination numbers to which a subscriber's calls are commonly forwarded. A recent study revealed that approximately 92% of subscribers forward to the same one or two numbers. Thus a small number of common routing destination numbers unique to each subscriber should be stored. This reduces the cost and time involved in revalidating each time one of the common destination numbers is entered.

By querying to a shorter list of previously verified routing destination numbers, the network would provide a quicker response to the subscriber and consume less network cost and time. Such a subscriber profile query may be utilized as a replacement to the network-wide search or in addition to the network-wide search.

SUMMARY OF THE INVENTION

It is a principal object of the present invention to provide a remote access forwarding method and system for forwarding calls incoming to a subscriber's telephone number to routing destination numbers not corresponding to a blocked destination identifier or number in a database. Such blocked destination identifier is preferably of the class of public or pay telephones or the like for which there is little likelihood that forwarding to such a number is legitimate.

It is a further object of the present invention to provide a remote access call forwarding method and system which is adapted for use in an Advanced Intelligent Network (AIN) for forwarding calls incoming to a subscriber's telephone number to routing destination numbers not identified as a blocked destination by a database.

It is yet a further object of the present invention to provide a remote access call forwarding method and system for forwarding communication calls incoming to a subscriber's telephone number to a routing destination number which is listed in a subscribers profile of commonly forwarded routing destination numbers.

In carrying out the above objects, features and advantages of the present invention, there is provided a method for use in a remote access forwarding service adapted for use in an Advanced Intelligent Network (AIN). In accordance with the invention, the method provides steps for forwarding a communication call incoming to a subscriber's telephone number to a routing destination number. The steps disclosed herein include the initial provision of storing a plurality of blocked destination identifiers or numbers in a database. The next step is receiving the proposed routing destination number to which the call incoming to the subscriber's telephone number is to be forwarded.

Further, searching of the database is performed to determine that the proposed routing destination number is not a blocked destination, or does not correspond to a blocked destination identifier, in the database. If no match exists (or there is no corresponding identifier), then the proposed routing destination number is accepted by the system, thereby allowing subsequent calls incoming to the subscriber's number to be forwarded to the routing destination number. In this instance, the routing destination number may also be stored in a subscriber profile unique to the subscriber or unique to the subscriber's directory telephone number.

However, if such a match exists, then the proposed routing destination number is not accepted by the system and the incoming calls are directed to a routing destination previously stored in the subscribers service profile, if one exists, or to the subscriber's telephone number.

Still further, in keeping with the invention, there is included a remote access call forwarding system adapted for use in an Advanced Intelligent Network (AIN) for forwarding a call incoming to a subscriber. Such system includes storage means for storing a plurality of blocked destination identifiers or numbers. Further, there is provided receiving means for receiving the proposed routing destination number to which the call incoming to the subscriber's telephone number is to be forwarded.

Still further, the system includes processing means in electrical communication with both the storage means and the receiving means for searching the database to determine that the routing destination does not correspond to a blocked destination identifier. Finally, there is provided forwarding means in electrical communication with the processing means for allowing forwarding of the incoming call in response to the routing destination number when the routing destination number does not correspond to a blocked destination identifier found in the database.

In this system, there is further provided second storage means for storing at least one valid destination number in a subscriber profile unique to the subscriber's telephone number. Additionally, second processing means exists in electrical communication with both the second storage means and the receiving means for searching the subscriber service profile for a valid destination number matching the routing destination number. Moreover, there exists a second forwarding means in electrical communication with the second processing means for forwarding the communication call in response to the routing destination number when the routing destination number matches a valid destination number found in the subscribers service profile.

The present invention contemplates blocked destinations (or blocked destination numbers) to be those telephones (or those telephone numbers) which are easily accessible by the public and thus susceptible to misuse. Such telephones, for example, include pay and public telephones, which further encompass both coin and coinless telephones or the like. These destinations are categorized by the phone company as having little legitimacy as a routing destination in the remote call access forwarding context. Of course, such blocked destinations may include any telephone number, or class of telephone, designated as such by the phone company.

In addition, such method and system should be able to store a plurality of individual blocked destination identifiers or numbers in a database. Therefore, when a routing destination number is received by the network, it is compared to the blocked destination identifiers or numbers in the database and will not permit communication calls to be forwarded to the proposed routing destination when the proposed routing destination number corresponds to a blocked destination identifier.

Further provided in the method and system is the capability of providing each subscriber with an individual subscriber profile in which is stored previous valid routing destination numbers unique to the subscriber or unique to the subscriber's telephone number. This allows the system to query to a shorter list and possibly gain forwarding approval quickly, prior to initiating a query to a larger database. This is beneficial because querying to a subscriber profile of valid routing destination numbers conserves the ample processing and screening time involved in querying to a larger database and obviates the high usage of network facilities.

The above objects and other objects, features, and advantages of the present invention are readily apparent from the following detailed description of the best modes for carrying out the invention when taken in connection with the accompanying drawings.

BEST MODE FOR CARRYING OUT THE INVENTION

Figure 1:
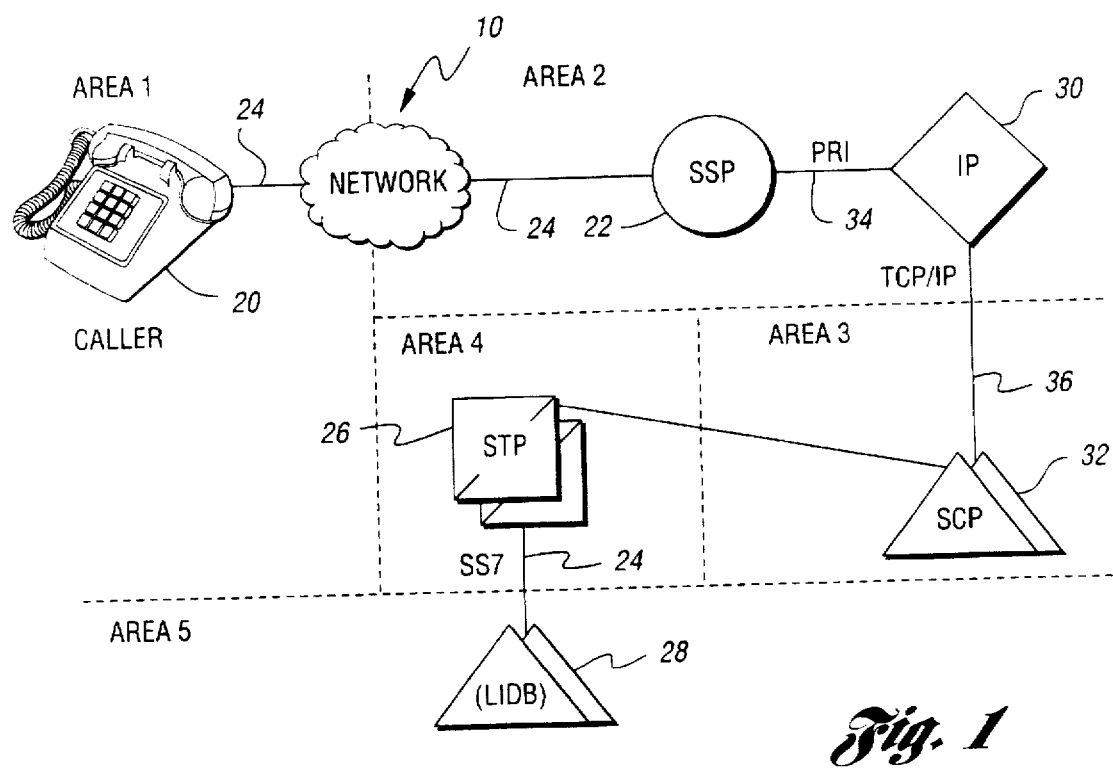
FIG. 1 is a schematic of the Advanced Intelligent Network system architecture for updating the subscriber service profiles of the service control point according to the present invention.

With reference to FIG. 1 of the drawings, a representative diagram of Advanced Intelligent Network (AIN) architecture is disclosed for use in a Public Switched Telephone Network (PSTN). The AIN architecture referred to is generally designated by reference numeral 10. The AIN architecture 10 incorporates, or is adapted to incorporate, the remote access forwarding (or remote access call forwarding) method and system of the present invention. Architecture 10 is known to those skilled in the art to permit subscriber services to be extended throughout the network.

Specifically, architecture 10 is utilized to access the subscriber controlled update menus in order to update the subscriber service profile (subscriber profile) related to the remote access forwarding of the present invention. The service profile contains, among other things, the data and information needed to forward a subscriber's call and is discussed more fully herein in association with the discussion of the Service Control Point (SCP) 32.

In addition to the architecture 10, FIG. 1 illustrates the possible locations for the network components involved when a user calls to listen to or update the subscriber's service profile. The areas identified could all be in the same Local Access and Transport Area (LATA), each could be in a different LATA, or some combination in-between. The LATA, well-known in the art, is a service area of a local exchange carrier or a local operating company. Note that the user as designated herein may or may not be the subscriber.

As those skilled in the art will recognize, network architecture 10 is implemented with a Common Channel Signaling (CCS) protocol, such as Common Channel Signaling System No. 7. (Herein referred to as "SS7 protocol"). The SS7 protocol is an out-of-band signaling path comprised of various packet switching elements 26 and transmission signaling links 24, some of which are shown in architecture 10.

As shown in FIG. 1, the Customer Premises Equipment (CPE) device of the caller or subscriber is represented and designated as telephone 20. However, it is clear that the CPE may include a modem, a facsimile machine, a voice messaging peripheral, or any other telecommunication equipment that may receive or transmit voice or data. As those skilled in the art will recognize, in operation, each telephone 20 is provided in electrical communication with a Service Switching Point (SSP) 22 via signalling links 23, through the network.

SSP 22 is generally a node (usually the subscriber's local switch/central office switch) that recognizes the "triggers" used when a subscriber or user invokes an AIN service such as remote access forwarding. Specifically in FIG. 1 and the related discussion, SSP 22 is a node which interacts with the SCP 32 in order to access and update the service logic for the subscriber's remote access forwarding profile.

As shown generally in FIG. 1, SSP 22 is further provided in electrical communication with database 28 via Signal Transfer Points (STPs) 26 and transmission signaling links 24. STP's are packet switches used to route signaling messages within the network as well as route call routing instructions to SSP 22. In still other embodiments, features such as an intelligent Peripheral (IP) 30 may be incorporated as shown in FIG. 1 and as further discussed below.

SCP 32 is a node which contains the service logic and associated data support needed to execute required customer and subscriber services, such as the remote access forwarding of the present invention. The service logic contained in SCP 32 includes a service profile for each subscriber or subscription service. For subscribers of remote access forwarding service, the profile typically consists of, but is not limited to, the status of the service (on/off or active/inactive), the active or current routing destination telephone number, if one exists, the subscriber's security code or personal identification number (PIN), and a listing of commonly forwarded routing destination numbers unique to the subscriber's telephone number.

SCP 32 may preferably be classified as an Integrated Service Control Point (ISCP) which is an integrated system well known in the art. Service logic stored in SCP 32 is accessible to each predetermined SSP 22 in the telephone system or network providing instructions on how to treat each individual call.

In a preferred embodiment, SCP 32 communicates with a database. The database stores information and identifiers regarding directory telephone numbers. This information is specifically contained in a Line Information Database (LIDB) 28. By way of example but not limitation—and moreover being relevant to the present invention—the LIDB 28 identifies a telephone's classification, such as public or pay telephone, coin or coinless, cellular, POTS business/residential, prison, etc. The LIDB database 28 further has contained or stored therein a Service or Equipment (SOE) Indicator reflecting the telephone's classification. As further shown in FIG. 1, SCP 32 is responsible for interfacing with the Intelligent Peripheral (IP) 30. This interface exists in the form of a Transport Control Protocol (TCP), commonly referred to as the Transport Control Protocol/Internet Protocol (TCP/IP).

A call to the subscriber interface platform is routed from SSP 22 to IP 30. Subsequently, IP 30 sends a message to the SCP 32 requesting instructions on how to handle the call. SCP 32 further provides announcement prompts and processes the digits received from the IP 30 (storing, retrieving and updating security codes, routing destination numbers and service status). If such a call seeks to change a subscriber's routing destination number in the subscriber profile, SCP 32 queries to the LIDB 28 to retrieve an identifier corresponding to the routing destination number. The identifier is typically a Service Or Equipment (SOE) Indicator or other identifier which must be checked, so that its blocking status may be determined, before a subscriber's routing destination number may be updated.

Each LIDB 28 is supported by one or more database administration systems (not shown) and is typically contained within its own Service Control Point (SCP). However, for purposes of this discussion, reference will specifically be made to LIDB 28. The LIDB 28 is responsible for, among other things, storing and retrieving the Service or Equipment (SOE) Indicator for each telephone numbers, designated as a plurality of routing destination identifiers, of both blocked and unblocked status.

As previously stated, the SOE Indicator determines or identifies the type of service or equipment on a line (i.e. coin or coinless pay telephone; public or semi-public telephone; POTS Line business/residential; cellular; prison; telephones provided by independent payphone providers (IPP); etc.) In the present invention, when a user attempts to change the subscriber's routing destination by entering a proposed routing destination number, SCP 32 sends a message to LIDB 28 to retrieve the SOE indicator corresponding to the proposed routing destination number in order to determine if it corresponds to a blocked destination, or if it is a blocked destination identifier.

The SOE Indicators are typical of those that follow:

| SOE Indicator | Description |
|---|---|
| 1 | POTS Line (Business/Residential) |
| 2 | LEC Public-Standard Interface-Postpay Overtime |
| 5 | LEC Semi-Public |
| 8 | Coinless |
| 9 | Coinless (IPP) |
| 19 | IPP-Standard Interface |
| 20 | IPP-Alternate Interface |
| 28 | Prison (IPP) |
| Other | |

By way of example, a user accesses a subscriber profile and desires to update the subscriber's routing destination number to a coinless telephone having directory number 303-XXX-1234. The system receives this routing destination number to which a call incoming to the subscriber's telephone number is to be forwarded. Thereafter, SCP 32 queries or searches the database LIDB 28 for the SOE Indicator corresponding to 303-XXX-1234, in order to determine that the routing destination number does not correspond to a blocked destination identifier. According to the above table, that SOE Indicator is an 8. The service logic of SCP 32 is programmed to determine or read an SOE Indicator equal to 8 as a blocked destination identifier.

In keeping with this invention, SOE Indicators equal to 2, 5, 8, 9, 19 20 or 28 as shown in the table above typically correspond to blocked destination numbers, or are determined to be blocked destination identifiers. However, this list is illustrative only and does not restrict what classes of telephones may be blocked or what SOE indicators may identify such blocked classes of telephones. Consequently, and as discussed further herein, the system will not accept a routing destination number corresponding to a blocked destination identifier. If anything other than a blocked destination identifier is determined, then the system will allow the forwarding of the call incoming to the subscriber's telephone number in response to the routing destination when the routing destination number does not correspond to a blocked destination identifier found in the database.

In another embodiment, SCP 32 may, instead of or in addition to LIDB 28, be provided in electrical communication with an external network-wide database for storing lists of actual blocked destination numbers or entries. A blocked destination number is any telephone number to which a call incoming to a subscriber's telephone number may not be forwarded. Again, by way of example but not limitation, blocked destination numbers may include public and pay telephone numbers, both coin and coinless, cellular telephone numbers and the like. However, any telephone number may be included as a blocked destination number in the external network-wide database.

Figure 2:
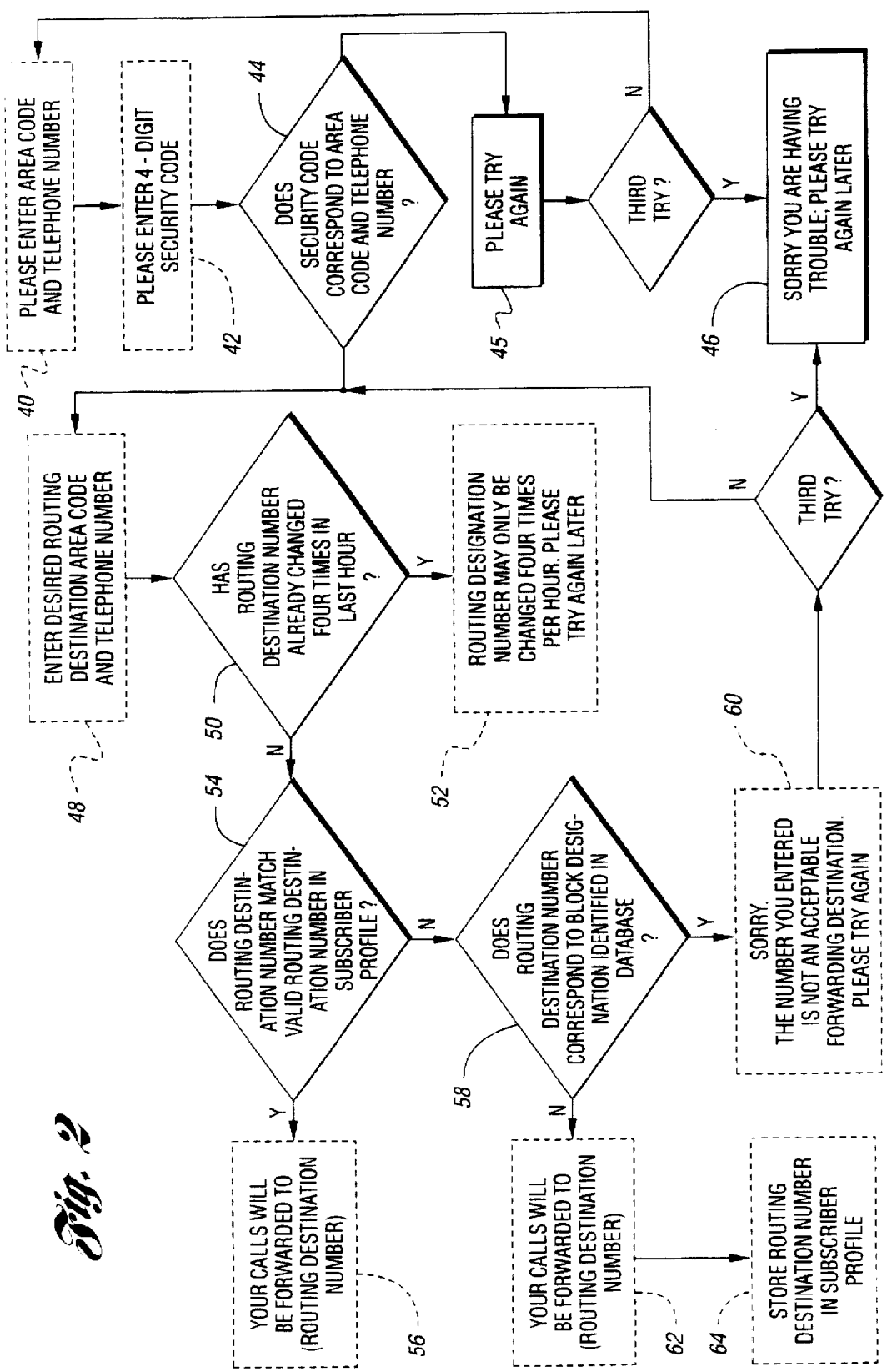
FIG. 2 is a flow diagram of a preferred embodiment according to the present invention.

FIGS. 1 and 2 illustrate a preferred system and method, respectively, of accessing a subscriber's remote access forwarding service and forwarding calls incoming to a subscriber's telephone number. In operation, a telephone user—who may or may not be the subscriber—wishing to route calls incoming to the subscriber's telephone number to another number, initiates a telephone call to a subscriber interface platform. Using an appropriate interface such as, for example, a Dual Tone Multifrequency (DTMF) keypad, the subscriber interface platform is reached by way of a given access telephone number, typically a local telephone number or 800 number. This interface platform access telephone number is provided so that subscribers are able to dial in and listen to or make changes to their respective service profiles.

When the user dials, from telephone 20, the interface platform access number for the subscriber interface platform, the call is routed through the SSP 22 to an intelligent Peripheral (IP) 30 in electrical communication with SSP 22. This electrical communication is preferably via a Primary Rate Interface (PRI) 34, a direct trunk circuit. IP 30 may also be known in the art as an Intelligent Services Peripheral (ISP). IP 30 provides the prompting announcements required to interact with the user. If the IP 30 is not within the same local calling area as the user, a market expansion line (not shown) is used to route the call out of the subscriber's local calling area to the IP 30, through the SSP 22.

When the call is routed from SSP 22 to the IP 30, the IP 30 sends a message to the Service Control Point (SCP) 32 requesting instructions on how to handle the call. It is understood by those of ordinary skill in the art that SCP 32 may be known as, or may exist as a component of an Integrated Service Control Point (ISCP), an integrated system well known in the telephony art. In this embodiment, SCP 32 is in electrical communication with the IP 30 using a Transport Control Protocol (TCP), commonly referred to as the Transport Control Protocol/Internet Protocol (TCP/IP) 36.

The SCP 32 returns a message to IP 30, informing IP 30 to prompt the user for the subscriber's area code and telephone number (i.e. collectively "directory number"), shown in FIG. 2 as step 40. The subscriber's directory number is preferably received in one of a plurality of specified formats. One specified format is a ten-digit directory number, consisting of the three-digit area code followed by the seven-digit telephone number. Another format used to enter the subscriber's directory number may be a 1+ten-digit directory number format.

After collecting the information from the user, the IP 30 returns the requested data to the SCP 32. The SCP 32 verifies that the subscriber's directory number has a certain service on the SCP 32, such as the remote access forwarding service of the present invention. SCP 32 thereafter instructs IP 30 to prompt the user for the subscriber's security code, shown as step 42 in FIG. 2. The IP 30 collects the requested information from the user and returns the data to the SCP 32. Again, SCP 32 contains the subscriber's profile associated with his/her subscription service.

Consequently, SCP 32 compares the entered security code with the security code associated with the subscribers' directory number stored in the profile, as shown in step 44 of FIG. 2. A successful verification confirms that the security code corresponds to the subscriber's directory number. If the security code is not successfully verified, the user is prompted to try again, step 45. Preferably, if a subscriber has two failed update sessions within a certain period of time (commonly 6 hours) because of incorrect entry of a security code, the third unsuccessful attempt to enter the security code within 6 hours causes the service to deactivate. Deactivation of the service requires reactivation on the part of the phone company. The subscriber is not able to re-activate the service on his/her own.

During the subscriber's service profile update session, the user is provided with up to three chances to enter the requested data for each prompt in the subscriber menu.

Preferably, if an incorrect entry has been detected, the subscriber is given an error message and re-prompted for the data as in step 45. If an incorrect entry is detected after two re-prompts, the subscriber hears a final announcement and the call is disconnected, as shown in step 46 of FIG. 2.

"Incorrect entries" refers to security codes, routing destination telephone numbers, and menu option choices; this is to ensure system security and to avoid excessive utilization of the system's resources. "Time-outs", or periods of time where there is no subscriber input when expected, is also considered an incorrect entry.

Upon successful security code verification, SCP 32 instructs IP 30, through a series of message exchanges, what announcements to play to the user and what digits to collect from the user for the specific subscription service. At this point in the call to the platform, digits collected from the user may result in changes to the subscriber's service profile. Specifically, in the present invention, such digits collected may result in changes to the subscriber's remote access forwarding profile.

Focusing again on FIGS. 1 and 2, in a preferred embodiment, after the user has correctly entered the subscriber directory number and its corresponding security code, the user is prompted to enter a desired routing destination number as shown in step 48 of FIG. 2. Because there exists a threshold for the number of times a subscriber's routing destination number may be changed in a certain period of time, step 50 performs such an audit.

If an attempt is made to exceed the threshold, the subscriber hears a final announcement and the call is disconnected, shown as step 52. This threshold is established at four changes per hour but of course may be more or less frequent. If the threshold has not been exceeded, then the received routing destination number is checked against the individual subscriber profile contained in SCP 32 as shown in step 54. The subscriber profile includes, among other data, the last four common routing destination numbers entered by, and unique to, the subscriber. These numbers may also be characterized as valid destination numbers or valid routing destination numbers.

Again, each of the last four valid destination numbers is preferably stored in one of a plurality of specified formats, the most common being a ten-digit number, being a three-digit area code followed by a seven-digit telephone number. Of course, the number of prior valid destination numbers stored in the subscriber's profile may vary and is not limited to four. If the search of the subscriber profile 54 determines that the routing destination number exists, or matches, a unique valid routing destination in the subscriber profile, then the routing destination number is considered valid. See step 56 in FIG. 2.

Consequently, step 56 shows that the system 10 accepts the routing destination number allowing the subscriber profile to be updated. The system allows calls incoming to the subscriber's telephone number to be forwarded to the routing destination number which has been validated by searching the subscriber profile, when the routing destination number matches a valid destination number found in the subscriber profile as shown in step 56. In this scenario, it is not necessary to query to another database, such as a LIDB 28 or an external network-wide database.

By way of example, it may be common for a subscriber to forward calls incoming to his or her home telephone number to a work telephone number. Thus the work telephone number would be contained in the individual subscriber profile as a frequently forwarded to or valid routing destination number. A recent study revealed that approximately 92% of subscribers forward to the same one or two numbers. Thus a small number of unique or valid routing destination numbers are stored per subscriber to reduce the cost and time involved in revalidating each time one of the common destination numbers is entered.

The subscriber service profile is quicker and easier to access for verification than is a query to LIDB 28. Thus a query to the subscriber service profile results in a quicker response time, requires less processing time and system memory, and is therefore less costly than a query to search LIDB 28. This type of search would again preferably be a preliminary step prior to conducting a search of LIDB 28.

Note that, in an alternative embodiment, the subscriber profile may contain a list of blocked destination numbers unique to the subscriber's telephone number (not shown). Specifically, this list of blocked destination numbers would contain those numbers to which the subscriber prohibits calls incoming to her to be forwarded. In this embodiment, if the routing destination number is a blocked destination number in the subscribers profile, then the routing destination is not deemed valid and the calls incoming to the subscriber are not forwarded. Again, in this instance, there is no need to query to the LIDB 28.

Returning to the embodiment shown in FIGS. 1 and 2, if the routing destination number does not exist in the subscriber profile of SCP 32, a query is sent from SCP 32 to LIDB 28. The LIDB 28 retrieves the Service or Equipment (SOE) Indicator corresponding to the desired or proposed routing destination number entered by the user. As previously described, a SOE Indicator exists for the majority of telephone numbers, and among other things, identifies whether the proposed routing destination number is that of a certain class of telephone, such as a public or pay telephone, as previously described. Examples of SOE Indicators have been set forth in the preceding table.

If the retrieved SOE indicator corresponding to the proposed routing destination identifies that of a blocked destination (i.e. pay or public telephone of both the coin and coinless type, etc.), then the SCP 32 does not accept (or disallows) the proposed routing destination number. In other words, if the service logic of SCP 32 is programmed to read the retrieved SOE Indicator as a blocked destination identifier, then the SCP 32 does not accept the proposed routing destination number. Thus, the subscribers profile does not change. Consequently thereafter, all calls incoming to the subscriber's telephone number will not be forwarded to the proposed routing destination number.

Instead, the call either continues to route to the current routing destination number designated in the subscriber profile if the service is on, or proceeds to the subscriber's telephone if the service is off. A signal is typically sent to the user that the proposed routing destination that was entered is not an acceptable routing destination, as in step 60. As previously discussed and as shown in FIG. 2, the user is given two more opportunities to enter a valid routing destination before the call is disconnected as in step 46.

On the other hand, if the retrieved SOE indicator corresponding to the proposed routing destination does not identify a blocked destination number (or does not correspond to a blocked destination identifier), then the proposed routing destination number is accepted or allowed. Subsequently, all calls incoming to the subscriber's telephone number are forwarded (or allowed to be forwarded) to the proposed routing destination number, step 62. This is in response to the routing destination number when the routing destination number does not correspond to a blocked destination identifier found in the LIDB 28 database. Thereafter, this routing destination number is stored in the subscriber profile as shown in step 64.

Preferably, by storing this routing destination number in the subscriber profile as in step 64, the routing destination number holds two designations or positions in the profile. First, it takes its place as both the current routing destination number to which all calls thereafter incoming to the subscriber's telephone number are forwarded, until the service is turned off or until the routing destination number is changed. Second, this routing destination number takes its position on the list of the four valid routing destination numbers in the subscriber's profile.

As in step 54, this list of valid routing destination numbers is checked each time a user desires to change the current routing destination number. The four valid routing destination numbers in the subscriber's profile are typically updated by a round-robin method, and thus only the four most recent validated routing destinations per subscriber are stored.

In an alternative embodiment feature to LIDB 28, an external network-wide database exists containing a plurality or list of blocked destination numbers or entries to which calls incoming to a subscriber may not be forwarded. Such plurality of blocked destination numbers may be in the form of a random list of specific individual or classes of blocked destination numbers. Queries to this database are effected to match the proposed routing destination to the lists of blocked destination numbers.

Returning to a preferred embodiment feature, once the changes to the service profile are complete, 99% of subscriber-controlled updates take effect within 30 seconds. This time takes into consideration the time it takes to make updates in the SCP and also considers the number of updates being made contemporaneously by other subscribers.

Figure 3:
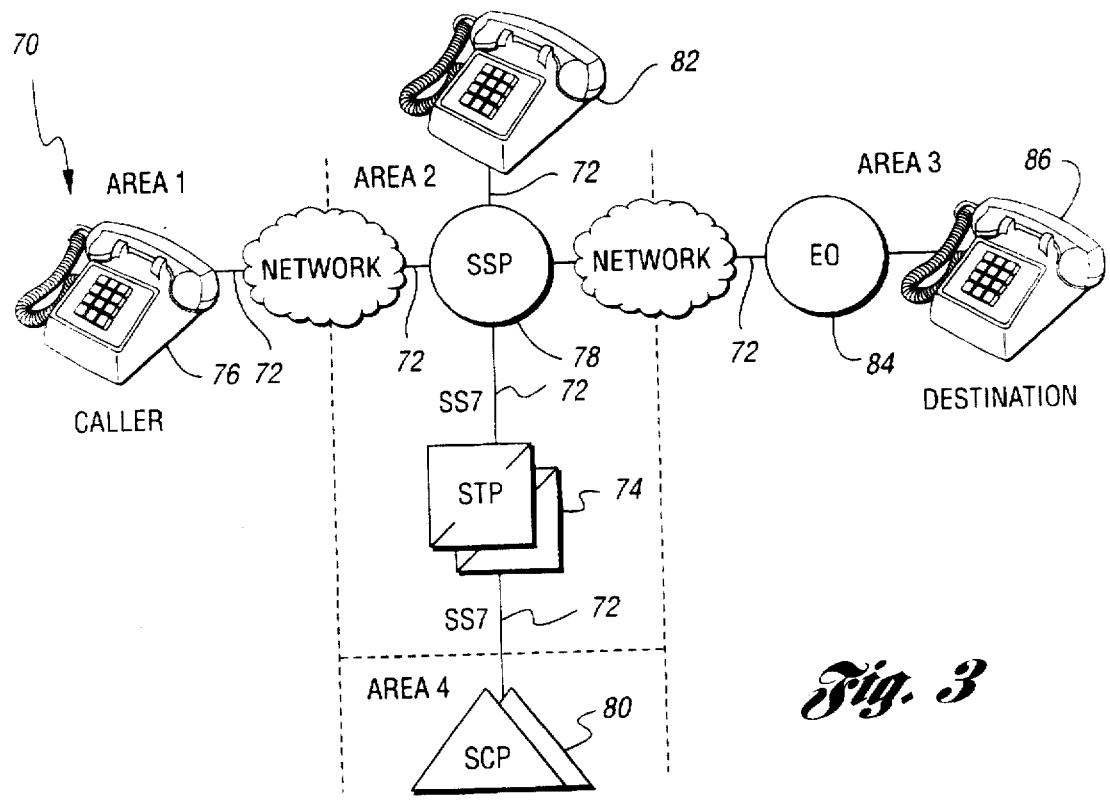
FIG. 3 is a schematic diagram of an architecture according to the present invention as it relates to a communication call incoming to the directory number of a subscriber to the remote access forwarding service.

FIG. 3 illustrates the architecture 70 for a caller dialing a remote access call forwarding subscriber's directory number. As in FIG. 1, the architecture 70 of FIG. 3 utilizes an SS7 protocol and all communications are via transmission signaling links 72 and packet switches such as STP 74. A caller dials the subscriber's telephone number from the CPE, represented as telephone 76.

The call made to the subscriber is routed to the local switch/central office serving the subscriber, shown as SSP 78, via signaling link 79 through the network. At the SSP 78 serving the subscriber, a trigger is detected and a query is sent to SCP 80, which corresponds to SCP 32 in FIG. 1. SSP 78 communicates with SCP 80 (discussed herein) to operate the service, generally whereby SSP 78 queries SCP 80 requesting instructions on how to handle a particular call, and SCP 80 responds with the appropriate instructions. In this case, the instructions consist of how to route a particular call.

The SCP 80 performs a query or search into the subscriber's service profile, which contains, for example the information relevant to the remote access call forwarding subscription of the present invention. If the subscriber's remote access forwarding service is turned off or inactive, SCP 80 directs the SSP 78 to route the incoming call directly to the subscriber's CPE, shown in FIG. 3 as telephone 82.

If the subscriber's remote access forwarding service is turned on or active, SCP 80 determines the destination for the call. More specifically, SCP 80 verifies from the subscriber's service profile contained therein that the service is on. Upon such verification, SCP 80 communicates a response to SSP 78, the response including the current routing destination number from the subscriber's service profile.

SSP 78 routes the call to the switch or central/end office serving the routing destination telephone number, shown as SSP 84. The end office/SSP 84 presents the call to the CPE associated with the routing destination number contained in the subscriber's service profile. This CPE is designated as telephone 86. Of course, if no current routing destination number exists in the profile, then the SCP 32 directs SSP 78 to direct the call to the subscriber's telephone 82 (or the number corresponding to the subscriber's telephone).

If the destination telephone 86 is not within the subscriber's local calling area, a record is generated to bill the subscriber's telephone number. In addition to the architecture, FIG. 3 also illustrates the possible locations for the network components involved in the call. The areas identified could all be in the same Local Access and Transport Area (LATA), each could be in a different LATA, or some combination in-between.

It is recognized that the incoming communication calls to the subscriber's directory number may be either telephone calls, data calls or a combination of each. For example, the subscriber may have remote access forwarding on the telephone number dedicated to a home facsimile machine. Remote access forwarding may be utilized so that the subscriber, while at work, may have all data calls incoming to his home facsimile machine routed to a routing destination number such as a work facsimile machine telephone number. Thus facsimiles sent to the subscriber's home could be timely received by the subscriber while at work.

While the best modes for carrying out the invention have been described in detail, those familiar with the art to which this invention relates will recognize various alternative designs and embodiments for practicing the invention as defined by the following claims.

What is claimed is:

1. For use in an Advanced Intelligent Network, a method for validating a routing destination number in a call forwarding system for forwarding a call incoming to a subscriber's telephone number to the routing destination number, the method comprising:

receiving each routing destination number to which the call incoming to the subscriber's telephone number is to be forwarded;

searching a database having a plurality of blocked destination identifiers stored therein to determine that the routing destination number does not correspond to a blocked destination identifier in the database; and allowing the forwarding of the call incoming to the subscriber's telephone number in response to the routing destination number when the routing destination number does not correspond to a blocked destination identifier found in the database.

2. The method of claim 1, further comprising:

storing the routing destination number in a subscriber profile unique to the subscriber's telephone number.

3. The method of claim 1, further comprising:

storing at least one valid destination number in a subscriber profile unique to the subscriber's telephone number.

4. The method of claim 3, further comprising:

searching the subscriber profile for a valid destination number matching the routing destination number to which a call incoming to the subscriber's telephone number is to be forwarded; and allowing the forwarding of the call in response to the routing destination number when the routing destination number matches a valid destination number found in the subscriber profile.

5. The method of claim 1, wherein the database is a Line Information Database (LIDB).

6. The method of claim 1, wherein the blocked destination identifier is a Service or Equipment (SOE) Indicator.

7. The method of claim 1, wherein the routing destination number is received in one of a plurality of specified formats.

8. The method of claim 1, further comprising:
communicating to the user that the routing destination number is not acceptable by the remote access forwarding service when the routing destination number corresponds to a blocked destination identifier.

9. The method of claim 1, wherein the call is a telephone call.

10. The method of claim 1, wherein the call is a data call.

11. A method for use in a remote access forwarding service adapted for use in an Advanced Intelligent Network for authorizing the forwarding of a call incoming to a subscriber's telephone number to a routing destination number selected by a user, the method comprising:
prompting the user for the routing destination number to which the call incoming to the subscriber's telephone number is to be forwarded;
receiving the routing destination number from the user to which the call incoming to the subscriber's telephone number is to be forwarded;
searching a database containing a plurality of blocked destination identifiers to determine that the routing destination number does not correspond to a blocked destination identifier; and
allowing the forwarding of the call incoming to the subscriber's telephone number to the routing destination number when the routing destination number does not correspond to a blocked destination identifier found in the database.

12. The method of claim 11, further comprising:
storing the routing destination number in a subscriber profile unique to the subscriber's telephone number.

13. The method of claim 11, further comprising:
searching a subscriber profile unique to the subscriber's telephone number having at least one valid destination number, for a valid destination number matching the routing destination number; and
allowing the forwarding of the call incoming to the subscriber's telephone number in response to the routing destination number when the routing destination number matches a valid destination number found in the subscriber profile.

14. The method of claim 11, wherein the routing destination number has one of a plurality of specified formats.

15. The method of claim 11, wherein the database is a Line Information Database (LIDB).

16. The method of claim 11, wherein the blocked destination identifier is a Service or Equipment (SOE) Indicator.

17. The method of claim 11, further comprising:
communicating to the user that the routing destination number is not acceptable by the remote access forwarding service when the routing destination number corresponds to a blocked destination identifier.

18. The method of claim 11, wherein the user is the subscriber.

19. The method of claim 11, wherein the call is a telephone call.

20. The method of claim 11, wherein the call is a data call.

21. A method for use in a remote access forwarding service adapted for use in an Advanced Intelligent Network for authorizing the forwarding of a call incoming to a subscriber's telephone number to a routing destination number designated by a user, the method comprising:
storing at least one valid routing destination number in a subscriber profile unique to the subscriber's telephone number;
receiving the routing destination number from the user to which the call incoming to the subscriber's telephone number is to be forwarded;
searching the subscriber profile for a valid routing destination number that matches the routing destination number;
allowing forwarding of the call to the routing destination number when the routing destination number matches a valid destination number found in the subscriber profile;
if no match is found in the subscriber profile, querying a Line Information Database having a plurality of Service or Equipment Indicators stored therein for a Service or Equipment Indicator corresponding to the routing destination number;
receiving a response from the Line Information Database which includes the Service or Equipment Indicator to determine whether the routing destination does not correspond to a blocked Service or Equipment Indicator;
allowing forwarding of the call incoming to the subscriber's telephone number in response to the routing destination number when the routing destination number does not correspond to a blocked Service or Equipment Indicator; and
storing the routing destination number in the subscriber profile.

22. A remote access forwarding system adapted for use in an Advanced Intelligent Network for authorizing the forwarding of a communication call incoming to a subscriber's telephone number to a routing destination number, the system comprising:
storage means for storing a plurality of blocked destination identifiers corresponding to telephone numbers to which a communication call may not be forwarded;
receiving means for receiving the routing destination number to which the communication call incoming to the subscriber's telephone number is to be forwarded;
processing means in electrical communication with both the storage means and the receiving means, the processing means for searching the storage means to determine that the routing destination number does not correspond to a blocked destination identifier in the storage means; and
verification means in electrical communication with the processing means for validating the routing destination number to allow forwarding thereto of the communication call when the routing destination number does not correspond to a blocked destination identifier found in the storage means.

23. The system of claim 22, further comprising:
second storage means for storing at least one valid destination number unique to the subscriber's telephone number.

24. The system of claim 23, further comprising:
second processing means in electrical communication with both the second storage means and the receiving means for searching the second storage means for a valid destination number matching the routing destination number; and second verification means in electrical communication with the second processing means for validating the routing destination number to allow forwarding thereto of the communication call when the routing destination number matches a valid destination number found in the subscriber profile.

* * * * *